(12) United States Patent
Bachu et al.

(10) Patent No.: US 9,805,075 B1
(45) Date of Patent: Oct. 31, 2017

(54) METHOD AND SYSTEM FOR A DATA PROTECTION POLICY GENERATOR

(71) Applicant: EMC Corporation, Hopkinton, MA (US)

(72) Inventors: Kiran K. Bachu, Cupertino, CA (US); Vladimir Mandic, San Jose, CA (US); Paul Popelka, Cupertino, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 581 days.

(21) Appl. No.: 13/729,249

(22) Filed: Dec. 28, 2012

(51) Int. Cl.
*G06F 7/00* (2006.01)
*G06F 17/00* (2006.01)
*G06F 17/30* (2006.01)

(52) U.S. Cl.
CPC .............................. *G06F 17/30312* (2013.01)

(58) Field of Classification Search
CPC .... G06F 17/30088; G06F 17/30; G06F 13/00; G06F 9/54; G06F 11/1458; G06F 11/3003; G06F 11/3055; G06F 2201/865; G06F 17/30312
See application file for complete search history.

(56) References Cited

U.S. PATENT DOCUMENTS

| 7,421,460 B2 * | 9/2008 | Chigusa et al. | |
| 2007/0061530 A1* | 3/2007 | Bourhis et al. | 711/162 |
| 2009/0172322 A1* | 7/2009 | Gilpin et al. | 711/162 |
| 2012/0123999 A1* | 5/2012 | Ashutosh et al. | 707/618 |

* cited by examiner

*Primary Examiner* — Azam Cheema
(74) *Attorney, Agent, or Firm* — Dergosits & Noah LLP; Todd A. Noah (57) ABSTRACT

A data protection policy generator is described. A first set of selections is received to generate a first task. The first set of selections includes selections of a first source, a first data set, a first destination, and a first execution schedule. A second set of selections is received to generate a second task. The tasks may be any of a backup copy task, a clone task, a backup verification task, a snapshot creation task, a snapshot backup task, a snapshot clone task, a backup delete task, a backup query task, or a restore task. The second set of selections includes selections of a second source, a second data set, a second destination, and a second execution schedule. The first data destination includes the second data source. Execution of the first task and the second task is enabled based on at least the first execution schedule and the second execution schedule.

36 Claims, 4 Drawing Sheets

METHOD AND SYSTEM FOR A DATA PROTECTION POLICY GENERATOR

BACKGROUND

If a software error corrupts a database, or if erroneous data updates the database, a database administrator may restore the database to a previous uncorrupted state that does not include the erroneous data. A backup application executes a backup operation either occasionally or continuously to enable this restoration, storing each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore the corresponding backup files for that state to the database. An additional copy that is made of the backup files and stored separately from the backup files may be referred to as a clone of the backup files.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

In the prior art, data protection administrators access and search data protection software, clients, and other resource definitions to determine their data protection lifecycles. These data protection administrators lack the ability to concisely specify the life cycle of data backed up, cloned, and eventually destroyed to meet their data protection requirements. Prior art methods to define data protection policies are spread across systems and complicated to setup. A prior art data protection policy created for one data set, source, and destination cannot be applied to another data set, source, and destination.

Embodiments herein provide a data protection policy generator. A data protection policy generator receives selections to generate a task, including the source, data set, destination, and execution schedule for the task, such as a backup copy task. The data protection policy generator receives selections to generate another task, including the source, data set, destination, and an execution schedule for the other task, such as a clone task. The tasks may be any type of data protection tasks, such as a backup copy task, a clone task, a backup verification task, a snapshot creation task, a snapshot backup task, a snapshot clone task, a backup delete task, or a backup query task. The task's destination is the other task's source, such as when a backup task's destination is the clone task's source. The data protection policy generator enables execution of the task and the other task based on the tasks' execution schedules. Data protection administrators access and search only a single component, the data protection policy generator, to determine their data protection lifecycles. The data protection policy generator provides data protection administrators with the ability to concisely specify the life cycle of data backed up, cloned, and eventually destroyed to meet their data protection requirements. Data protection administrators may easily apply a data protection policies created for a specific data, source, and destination to another data, source, and/or destination.

Figure 1:
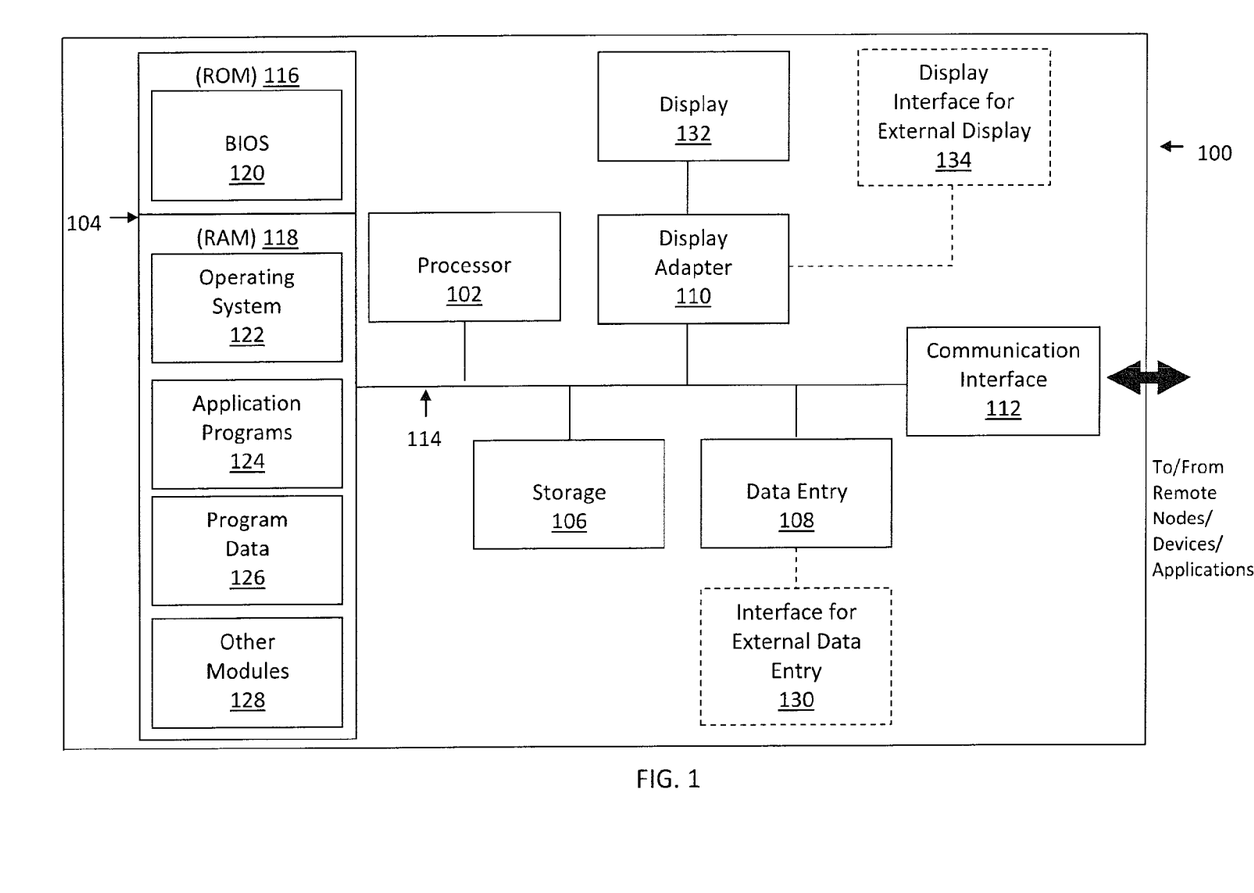
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for a data protection policy generator.

In the prior art, data protection administrators access and search data protection software, clients, and other resource definitions to determine their data protection lifecycles. These data protection administrators lack the ability to concisely specify the life cycle of data backed up, cloned, and eventually destroyed to meet their data protection requirements. Prior art methods to define data protection policies are spread across systems and complicated to setup. A prior art data protection policy created for one data set, source, and destination cannot be applied to another data set, source, and destination. Embodiments herein provide a data protection policy generator. Data protection administrators access and search only a single component, the data protection policy generator, to determine their data protection lifecycles. The data protection policy generator provides data protection administrators with the ability to concisely specify the life cycle of data backed up, cloned, and eventually destroyed to meet their data protection requirements. Data protection administrators may easily apply a data protection policy created for a specific data set, source, and destination to another data set, source and destination.

Figure 2:
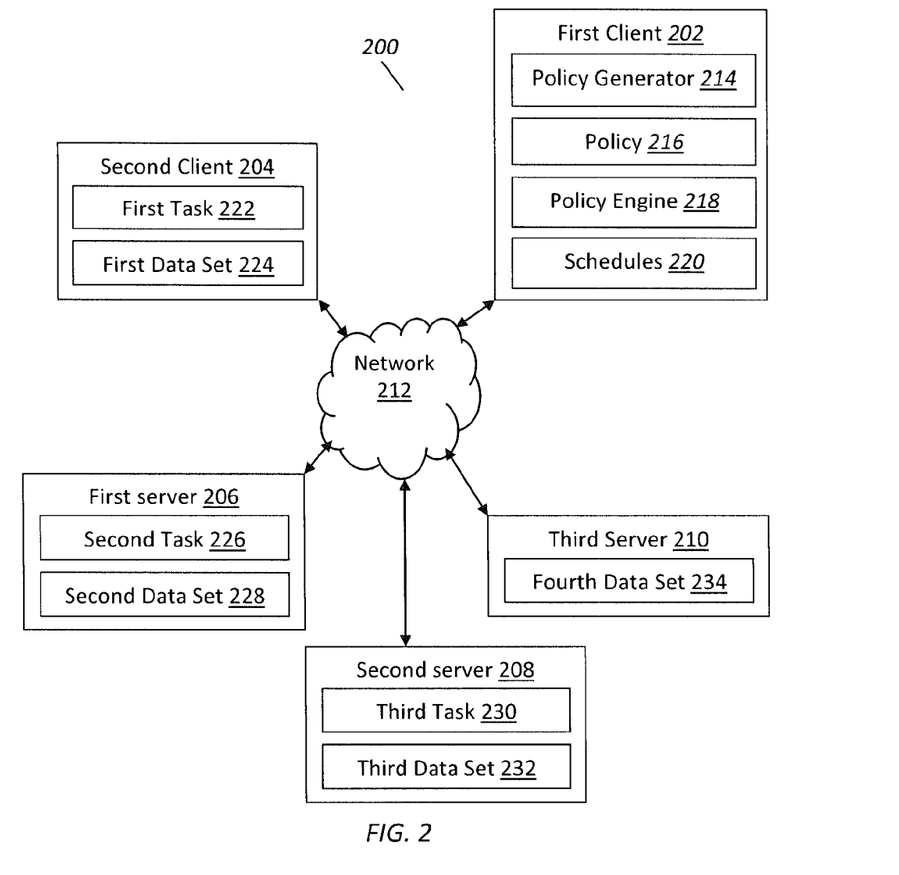
FIG. 2 illustrates a block diagram of an example system for a data protection policy generator, under an embodiment.

FIG. 2 illustrates a block diagram of a system that implements a data protection policy generator, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202 and a second client 204; and a first server 206, a second server 208, and a third server 210 that are provided by a hosting company. The clients 202-204 and the servers 206-210 communicate via a network 212. Although FIG. 2 depicts the system 200 with two clients 202-204, three servers 206-210, and one network 212, the system 200 may include any number of clients 202-204, servers 206-210, and networks 212. The clients 202-204 and the servers 206-210 may each be substantially similar to the system 100 depicted in FIG. 1. The first client 202 is a computer system that enables a data protection administrator to create a data protection policy that uses the servers 206-210 as storage devices to protect data for the second client 204.

A data protection administrator uses the first client 202, whereas a customer of the data protection administrator uses the second client 204. Data for the second client 204 may be stored on the first server 206, the second server 208, and the third serve 210. The first client 202 includes a policy generator 214, which generates a policy 216 that is executed by a policy engine 218 based on one of the schedules 220, such as a policy schedule. The second client 204 includes a first task 222 and a first data set 224, the first server 206 includes a second task 226 and a second data set 228, the second server 208 includes a third task 230 and a third data set 232, and the third server 210 includes a fourth data set 234. The policy 216 includes the tasks 222, 226, and 230, which may be any type of data protection task, such as a backup copy task, a clone task, a backup verification task, a snapshot creation task, a snapshot backup task, a snapshot clone task, a backup delete task, and a backup query task. While the policy generator 214 has been described herein as generating the policy 216 to include three tasks 222, 226 and 230, one skilled in the art would understand that policy 216 may include more than three tasks. Similarly, while the system 200 has been described herein as having four data sets 224, 228, 232, and 234, one skilled in the art would understand that the system 200 may include any number of data sets. FIG. 2 depicts the system elements 214-220 residing completely on the first client server 202 with the tasks 222, 226, and 230 residing completely on the second client 204, the first server 206, and the second server 208, respectively. However, the system elements 214-220 and the tasks 222, 226, and 230 may reside completely on the first client 202, completely on the second client 204, the first server 206, and the second server 208, or in any combination of partially on the first client 202 and partially on the second client 204, the first server 206, and the second server 208.

The policy generator 214 receives a first set of selections to generate a first task, wherein the first set of selections includes selections of a first source, a first data set, a first destination, and a first execution schedule. For example, the policy generator 214 receives selections to generate the first task 222 to create a backup of the first data set 224 in the source, the second client 204, and store the backup as the second data set 228 in the destination, the first server 206, based on a backup execution schedule in the schedules 220. The source and/or the destination for a task may be implied if selection options are limited. For example, if a backup application executes to store backup copies of data from a client to a server, and the backup application has access to no other client and no other server, the selection of the source and the destination may be implied as the client and the server. The source may include multiple source nodes, and the multiple source nodes may include a disk source node, a tape source node, and/or a source node that is a combination of disks and tapes. For example, the second client 204 may store the first data set 224 on a disk, on a tape, or partly on a disk and partly on a tape. A data protection administrator may use the policy generator 214 to specify a query for data sets, and identify the response to the query as the data set to be copied. The destination may include multiple destination nodes, and the multiple destination nodes may include a disk destination node, a tape destination node, and/or a destination node that is a combination of disks and tapes. For example, the first server 206 may store the second data set 224 on a disk, on a tape, or partly on a disk and partly on a tape. A data protection administrator may use the policy generator 214 to specify a priority for storing copies of data on destination nodes, such as storing only on disks, or storing on disks before storing on a combination of disks and tapes. Additionally, a data protection administrator may use the policy generator 214 to specify the options for data to be encrypted and/or compressed while being transmitted from the source, and the options for data to be decrypted and/or decompressed when stored on the destination.

The policy generator 214 receives a second set of selections to generate a second task, wherein the second set of selections includes selections of a second source, a second data set, a second destination, and a second execution schedule, and wherein the first data destination includes the second data source. For example, the policy generator 214 receives selections to generate the second task 222 to create a primary clone of the second data set 224 in the source, the first server 206, and store the primary clone as the third data set 232 in the destination, the second server 208, based on a primary clone execution schedule in the schedules 220. The source may include multiple source nodes, and the multiple source nodes may include a disk source node, a tape source node, and/or a source node that is a combination of disks and tapes. For example, the first server 206 may store the second data set 228 on a disk, on a tape, or partly on a disk and partly on a tape. Similarly, the destination may include multiple destination nodes, and the multiple destination nodes may include a disk destination node, a tape destination node, and/or a destination node that is a combination of disks and tapes. For example, the second server 208 may store the third data set 232 on a disk, on a tape, or partly on a disk and partly on a tape.

The policy generator 214 may receive a third set of selections to generate a third task, wherein the third set of selections includes selections of a third source, a third data set, a third destination, and a third execution schedule, and wherein the first data destination and/or the second data destination includes the third data source. For example, the policy generator 214 receives selections to generate the third task 230 to create a secondary clone of the third data set 232 in the source, the second server 208, and store the secondary clone as the fourth data set 234 in the destination, the third server 210, based on a secondary clone execution schedule in the schedules 220. The source may include multiple source nodes, and the multiple source nodes may include a disk source node, a tape source node, and/or a source node that is a combination of disks and tapes. For example, the second server 208 may store the third data set 232 on a disk, on a tape, or partly on a disk and partly on a tape. Similarly, the destination may include multiple destination nodes, and the multiple destination nodes may include a disk destination node, a tape destination node, and/or a destination node that is a combination of disks and tapes. For example, the third server 210 may store the fourth data set 234 on a disk, on a tape, or partly on a disk and partly on a tape.

The policy generator 214 may enable communication of data between tasks, and persist communication of data between tasks beyond an application crash, a system outage, and/or a network failure. For example, the policy generator 214 creates inter-task pipes that communicate data between the tasks 222, 226, and 230, the backup task and the clone tasks, which enable the tasks 222, 226, and 230 to identify the data sets 228 and 232 as a destination for a previous task and a source for a corresponding subsequent task.

In the prior art, some backup applications used filtering to determine which backup copies were subsequently cloned. Filtering did not necessarily result in cloning a backup copy if the backup process starts at a different time or ran for a longer duration than expected by the clone filtering criteria. The policy 216 should create clones only for backups that the policy 216 created. Therefore, a backup task that creates backup copies needs to create a list of the backup copies created and convey this list to the clone task that corresponds to the backup task. The policy generator 214 creates inter-task pipes to meet this data communication need. Inter-task pipes persist until all tasks that consume the inter-task pipe's data have executed because the task that creates the list for an inter-task pipe may complete execution before a task that needs the list begins execution. Inter-task pipes persist after outages caused by network failures and application crashes. An inter-task pipe enables a task to read data from the inter-task pipe while another task provides the inter-task pipe with data. Multiple tasks may concurrently provide data to the same inter-task pipe, and multiple tasks may read data from the same inter-task pipe, with each reading task keeping track of its position in the inter-task pipe. When an inter-task pipe and its data content are no longer needed, the policy engine 218 may delete the inter-task pipe. The policy engine 218 may use remote procedure calls to create, monitor, and delete inter-task pipes.

The policy generator 214 may execute a policy based on a policy schedule to monitor a task failure, log a task output, suspend a task, and/or resume execution of a suspended task. For example, the policy generator 214 executes the policy 216 based on a policy schedule in the schedules 220 to monitor any failure of the tasks 222, 226, and 230, log output of the tasks 222, 226, and 230 for troubleshooting purposes, suspend the tasks 222, 226, and 230, and/or resume execution of suspended tasks 222, 226, and 230. A task success means that a task was able to complete all of its work successfully. A task failure means that a task was not able to complete all of its work successfully, which implies that the corresponding task may have been able to complete some of its work successfully. Similarly, the policy engine 218 may monitor the policy 216 for a policy success or a policy failure, which may be similar to a task success or a task failure.

The policy generator 214 enables execution of tasks based at least on the execution schedules. For example, the policy generator 214 creates the tasks 222, 226, and 230 such that the policy engine 218 executes remote procedure calls to execute the tasks 222, 226, and 230 based on the schedules 220, which include a policy execution schedule, a backup execution schedule, a primary clone execution schedule, and a secondary clone execution schedule. After the policy generator 214 generates the policy 216, the policy engine 218 starts the policy 216 based on a schedule for the policy 216, when the day and time of execution for the policy 216 has arrived. The policy 216 defines the tasks 222, 226, and 230 that are part of the policy 216, and the order in which the tasks 222, 226, and 230 are executed.

In one example, the policy engine 218 executes the first task 222 to make a backup copy of the first data set 224 and store the backup copy as the second data set 228, executes the second task 226 to make a clone of the second data set 228 and store the clone as the third data set 232 for offsite data replication, and executes the third task 230 to make a secondary clone of the third data set 232 and store the second clone as the fourth data set 234 for long-term data retention on a tape storage associated with the third server 210. In another example, the policy engine 218 executes the first task 222 to make a backup copy of the first data set 224 and store the backup copy as the second data set 228, which the first server 206 stores on a tape storage, and executes the second task 226 to verify that the backup copy was accurately stored on the tape storage. In yet another example, the policy engine 218 executes the first task 222 to create a snapshot copy of the first data set 224, executes the second task 226 to store the snapshot copy as the second data set 228, executes the third task 230 to clone the snapshot copy as the third data set 232, and executes a fourth task (not depicted in FIG. 2) to delete the snapshot created by the first task 222.

The policy engine 218 may execute a copy task for the duration of a copy window. A copy window exists at the time when the processors, networks, and disk subsystems involved in the copy process are usually at a low utilization for production purposes. The policy engine 218 may suspend tasks that have exceeded the duration of their copy window. A suspended task records the point of execution it is in upon suspension, terminates gracefully, and may later resume execution at the same point of execution. All tasks may not be required to support suspension, as such tasks may be free to ignore a suspension request, abort itself, or suspend itself. Once a task is suspended, the work of the suspended task may need to be completed at a later time. If execution of the copy task for the duration of the copy window is insufficient to complete execution of the copy task, the policy engine 218 may resume the suspended task and execute the resumed copy task for the duration of a catch up window. A data protection administrator may use the policy generator 214 to specify actions to take if execution of the resumed task exceeds the duration of the catch up window. Similar to a copy task needing to execute within a time specified by a copy window, a policy that includes tasks such as the copy task may need to execute within a time specified by its own window, a policy window. The policy engine 218 may require the policy 216 to execute within the duration of the policy window, and may suspended the policy 216 if execution of the policy 216 exceeds the duration of the policy window. Similar to the resumption of a copy task for the duration of a catch up window, the policy engine 218 may resume the policy 216 and require the resumed policy 216 to execute during the duration of a policy catch up window. A data protection administrator may use the policy generator 214 to specify actions to take if execution of the resumed policy exceeds the duration of the policy catch up window.

Data protection administrators may use the policy generator 214 to generate a specific policy 216 based on the specific needs of a customer, and reuse that policy 216 for customers with similar needs. For example, a data protection administrator may use the policy generator 214 to generate a "gold" policy for VMware® clients, a "platinum" policy for UNIX® clients, and a "silver" policy for Windows® clients. The gold policy can specify to store 2 backup copies for each VMware® client onto a first disk for 6 months, store a primary clone of the backups on a second disk 1 year, and store a secondary clone of the backups on a tape for 5 years. In this example, the data protection administrator that used the policy generator 214 to generate the gold policy for a specific set of VMware® clients may later apply another instance of the same gold policy to a different set of VMware® clients. Similarly, the data protection administrator may apply another instance of the same platinum policy to a different set of UNIX® clients. Data protection administrators access and search only a single component, the data protection policy generator, to determine their data protection lifecycles. The data protection policy generator provides data protection administrators with the ability to concisely specify the life cycle of data backed up, cloned, and eventually destroyed to meet their data protection requirements. Data protection administrators may easily apply a data protection policy created for a specific data set, source, and destination to another data set, source, and destination.

Figure 3:
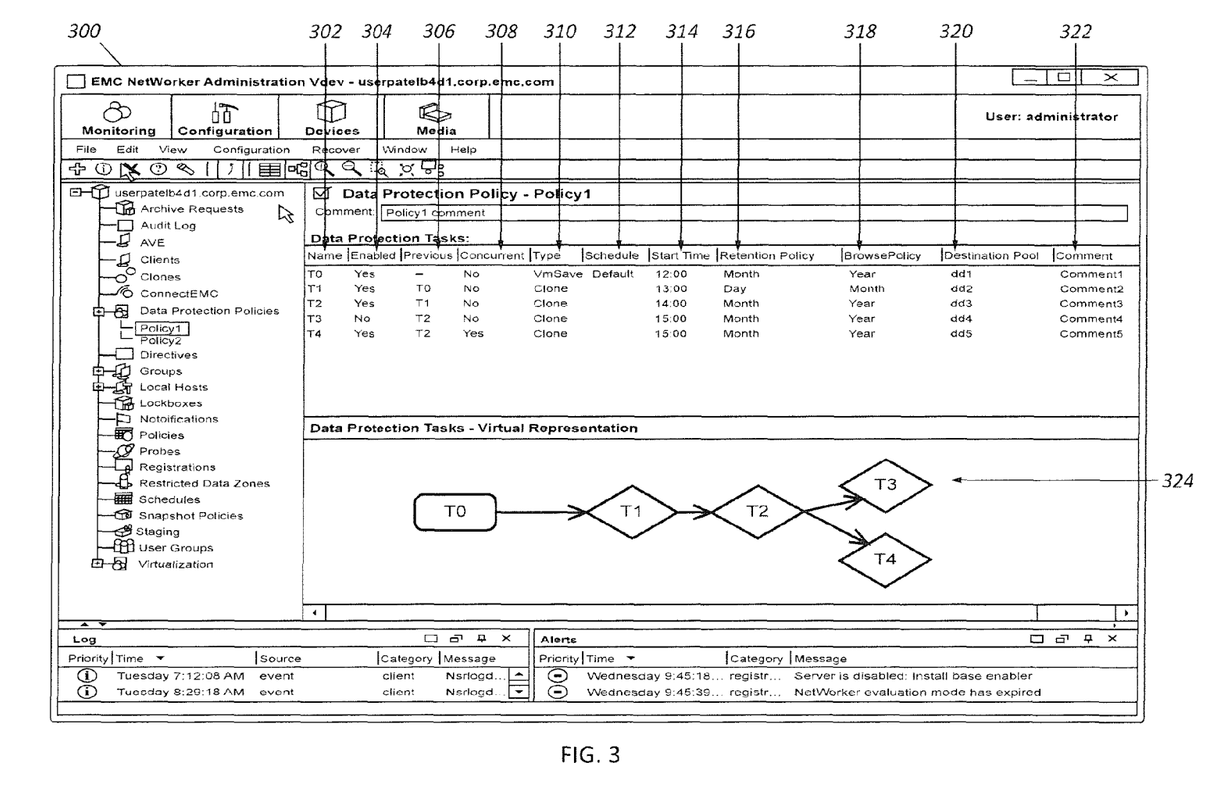
FIG. 3 illustrates a screen shot illustrating a frame of an example user interface screen of a display device supporting methods for a data protection policy generator, under an embodiment.

FIG. 3 is a screen shot illustrating a frame of an example user interface screen of a display device supporting methods for a data protection policy generator. The frame 300 may include a "name" column 302, an "enabled" column 304, a "previous" column 306, a "concurrent" column 308, a "type" column 310, a "schedule" column 312, a "start time" column 314, a "retention policy" column 316, a "browse policy" column 318, a "destination pool" column 320, a "comment" column 322, and a tasks view 324. The "name" column 302 enables a user to enter and/or view the names of the children tasks for a parent policy, such as T0, T1, T2, T3, and T4. The "enabled" column 304 enables a user to enable or disable a task and/or view whether a task is enabled or disabled.

The "previous" column 306 enables a user to specify and/or view the names of the previous task that executes prior to the execution of a specified task, such as T0, T1, and T2. The "concurrent" column 308 enables a user to specify whether a task executes concurrent with the execution of other tasks and/or view whether a task executes concurrent with the execution of other tasks. In the prior art, many mechanisms for creating backups and clones are not flexible enough to do what some customers may want to do. For example, a backup application may not be able to begin creating clones of any of the backups created as each backup is created until the backup application is finished creating all of its current set of backups. When backup data was only stored on tape, concurrent cloning was not an issue. However, since backup data is often stored to disks, waiting for the completion of all backups before beginning the cloning process is no longer the optimal use of resources. If the "concurrent" column 308 is set to "no" for a task, the task does not begin execution until the task identified in the "previous" column 306 is finished executing. If the "concurrent" column 308 is set to "yes" for a task, the task may begin executing concurrently with the execution of the task identified in the "previous" column 306. A user may specify a maximum number, such as 5, of concurrent tasks that may execute concurrently with a specific task.

The "type" column 310 enables a user to enter and/or view a task type, such as a VmSave, which creates a backup copy of a VMware® dataset, or clone, which either creates a clone of a backup copy of a VMware® dataset, or a clone of a clone of a backup copy of a VMware® dataset, for example. The "schedule" column 312 enables a user to enter and/or view whether a policy is executed based on a default schedule. The "start time" column 314 enables a user to enter and/or view the start times of the children tasks for a parent policy, such as 12:00, 13:00, 14:00, and 15:00. The "retention policy" column 316 enables a user to enter and/or view the length of time that the data copied by a task is retained before the data is destroyed, such as a day and a month. The retention policy enables a user to retain a copy of data as long as a user believes retention of the copy of the data is beneficial based on a cost/benefit analysis. The "browse policy" column 318 enables a user to enter and/or view the length of time that a copy of data may be browsed, such as a month or a year. The "destination pool" column 320 enables a user to enter and/or view the names of the destination pools where tasks create copies of data, such as dd1, dd2, dd3, dd4, and dd5. The "comment" column 322 enables a user to enter and/or view comments about the children tasks for a parent policy. Although not depicted by the columns 302-322, a user may also enter and/or view a number of copies to be created by a task, and a number of retries to attempt before halting further attempts following a failed task. For example, a user may specify that the task T0 creates 2 backups of its data set, and that T0 will make at most 5 attempts to create its backup copies if T0 fails at its previous attempts to make backup copies of its data.

A data protection administrator may use the policy generator 214 to add and/or remove children tasks from a parent policy. A data protection administrator may also use the policy generator 214 to share a task between policies, but all policies sharing the task are affected by modifications made to the shared task. A data protection administrator may further use the policy generator 214 to delete a policy, but deleting a policy may not necessarily delete any of the tasks used by the policy. Additionally, a data protection administrator may use the policy generator 214 to manually suspend and/or resume policies and/or tasks.

The tasks view 324 enables a user to enter and/or view a visual representation of the tasks for a policy, such as T0, T1, T2, T3, and T4. In this example, T0 is the backup copy task, T1 clones the backup copy created by T0, T2 clones the cloned copy created by T1, and both T3 and T4 clone the cloned copy created by T2.

Additional examples, which are not depicted, may illustrate the flexibility that the policy generator 214 provides for data protection administrators in creating data protection policies for customers. In an example, a first task creates a backup copy every night at 11:00 PM, and a second task clones copies of the backup copy after all backup copies are completed. In another example, a first task creates a backup copy every night at 11:00 PM, and a second task concurrently clones copies of the backup copy while each backup copy is being completed. In a yet another example, a first task creates a backup copy every night at 11:00 PM, a second task concurrently clones copies of the backup copy while each backup copy is being completed from Monday through Saturday, and a third task clones copies of the backup copy after each backup copy is completed on Sunday. In a further example, a first task creates a backup copy every afternoon at 1:00 PM and every morning at 1:00 AM, and a second task clones copies of the backup copy after each backup copy is completed on Day 1.

The frame 300 may be part of a larger display screen that includes fields for users to enter commands to create, retrieve, edit, and store records. The system 200 in FIG. 2 may output a display screen that includes the frame 300 in response to a search based on search criteria input via a user interface. Because the frame 300 is a sample, the frame 300 could vary greatly in appearance. For example, the relative sizes and positioning of the text is not important to the practice of the present disclosure. The frame 300 can be depicted by any visual display, but is preferably depicted by a computer screen. The frame 300 could also be output as a report and printed or saved in electronic format, such as PDF. The frame 300 can be part of a personal computer system and/or a network, and operated from system data received by the network, and/or on the Internet. The frame 300 may be navigable by a user. Typically, a user can employ a touch screen input or a mouse input device to point-and-click to a location on the frame 300 to manage the text on the frame 300, such as a selection that enables a user to edit the text. Alternately, a user can employ directional indicators, or other input devices such as a keyboard. The text depicted by the frame 300 is an example, as the frame 300 may include a much greater amount of text. The frame 300 may also include fields in which a user can input textual information.

Figure 4:
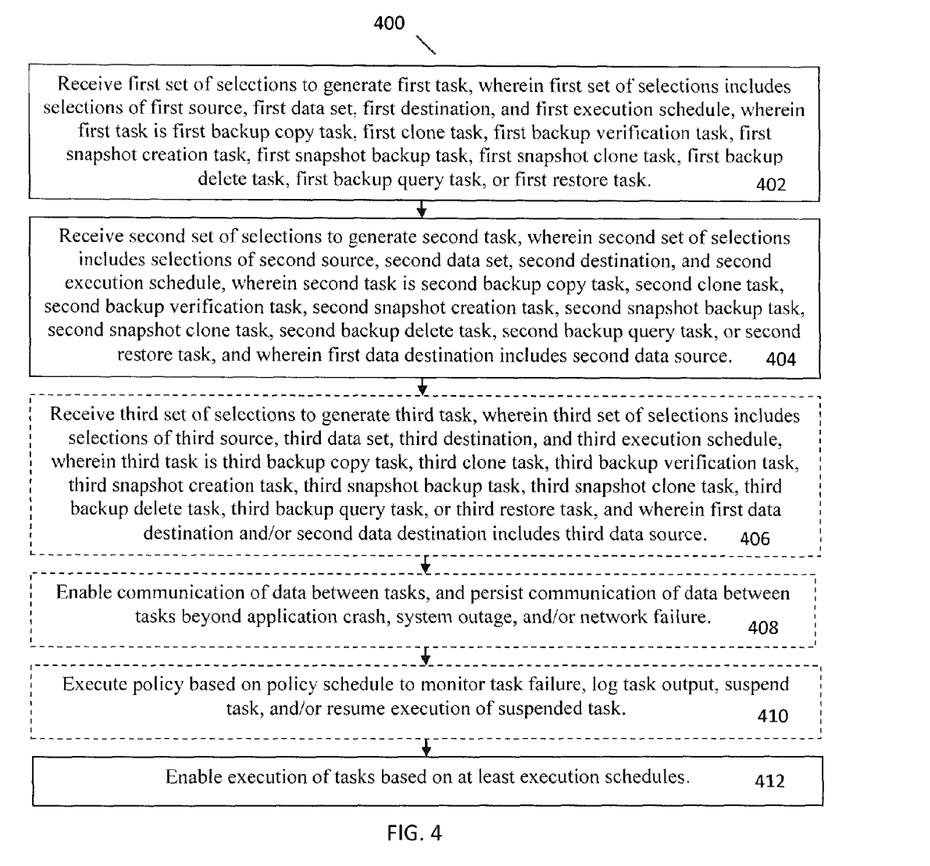
FIG. 4 is a flowchart that illustrates a method of a data protection policy generator, under an embodiment.

FIG. 4 is a flowchart that illustrates a method of a data protection policy generator. Flowchart 400 illustrates method acts illustrated as flowchart blocks for certain steps involved in and/or between the clients 202-204 and/or the servers 206-210 of FIG. 2.

A first set of selections are received to generate a first task, wherein the first set of selections includes selections of a first source, a first data set, a first destination, and a first execution schedule, wherein the first task is any type of data protection task, such as a backup copy task, a clone task, a backup verification task, a snapshot creation task, a snapshot backup task, a snapshot clone task, a backup delete task, a backup query task, or a restore task, act 402. For example, the policy generator 214 receives selections to generate the first task 222 to create a backup of the first data set 224 in the source, the second client 204, and store the backup as the second data set 228 in the destination, the first server 206, based on a backup execution schedule in the schedules 220.

A second set of selections is received to generate a second task, wherein the second set of selections includes selections of a second source, a second data set, a second destination, and a second execution schedule, wherein the second task is any type of data protection task, such as a backup copy task, a clone task, a backup verification task, a snapshot creation task, a snapshot backup task, a snapshot clone task, a backup delete task, a backup query task, or a restore task, and wherein the first data destination includes the second data source, act 404. For example, the policy generator 214 receives selections to generate the second task 226 to create a primary clone of the second data set 228 in the source, the first server 206, and store the primary clone as the third data set 232 in the destination, the second server 208, based on a primary clone execution schedule in the schedules 220.

A third set of selections is optionally received to generate a third task, wherein the third set of selections includes selections of a third source, a third data set, a third destination, and a third execution schedule, wherein the third task is any type of data protection task, such as a backup copy task, a clone task, a backup verification task, a snapshot creation task, a snapshot backup task, a snapshot clone task, a backup delete task, a backup query task, or a restore task, and wherein the first data destination and/or the second data destination includes the third data source, act 406. For example, the policy generator 214 receives selections to generate the third task 230 to create a secondary clone of the third data set 232 in the source, the second server 208, and store the secondary clone as the fourth data set 234 in the destination, the third server 210, based on the secondary clone execution schedule in the schedules 220.

Communication of data between tasks is optionally enabled, and communication of data between tasks is optionally persisted beyond an application crash, a system outage, and/or a network failure, act 408. For example, the policy generator 214 creates inter-task pipes that communicate data between the tasks 222, 226, and 230, the backup task and the clone tasks, which enable the tasks 222, 226, and 230 to identify the data sets 228 and 232 as a destination for a previous task and a source for a corresponding subsequent task.

A policy is executed based on a policy schedule to monitor a task failure, log a task output, suspend a task, and/or resume execution of a suspended task, act 410. For example, the policy generator 214 executes the policy 216 based on a policy schedule in the schedules 220 to monitor any failure of the tasks 222, 226, and 230, log output of the tasks 222, 226, and 230, suspend the tasks 222, 226, and 230, and/or resume execution of suspended tasks 222, 226, and 230.

Execution of tasks is enabled based at least on execution schedules, act 412. For example, the policy generator 214 creates the tasks 222, 226, and 230 such that the policy engine 218 executes remote procedure calls to execute the tasks 222, 226, and 230 based on the schedules 220, which include a policy execution schedule, a backup execution schedule, a primary clone execution schedule, and a secondary clone execution schedule.

Although FIG. 4 depicts the acts 402-412 occurring in a specific order, the acts 402-412 may occur in another order. Data protection administrators access and search only a single component, the data protection policy generator, to determine their data protection lifecycles. The data protection policy generator provides data protection administrators with the ability to concisely specify the life cycle of data backed up, cloned, and eventually destroyed to meet their data protection requirements. Data protection administrators may easily apply a data protection policy created for a specific data set, source, and destination to another data set, source, and destination.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for a data protection policy generator, the system comprising:
a processor-based application, which when executed on a computer, will cause the computer to:
generate, by a first client computer, a first task to be executed according to a first execution schedule, the first task causing a first data set residing on a second client computer to be stored as a second data set on a first destination server different from the the second client computer, the second data set being a backup copy of the first data set;
generate, by the first client computer, a second task to be executed according to a second execution schedule, the second task causing the second data set stored on the first destination server to be stored as a third data set on a second destination server different from the second client computer and the first destination server, the third data set being a clone copy of the second data set;
cause, by the first client computer, a communication between the first task and the second task, the communication indicating a dependency of the clone copy on the backup copy; and
enable, by the first client computer, execution of the first task and the second task based on the first execution schedule and the second execution schedule such that the first task is executed according to the first execution schedule before execution of the second task according to the second execution schedule in response to the communication indicating the dependency of the clone copy on the backup copy.

2. The system of claim 1, wherein the first task comprises a task selected from a group comprising a first backup copy task, a first clone task, a first backup verification task, a first snapshot creation task, a first snapshot backup task, a first snapshot clone task, a first backup delete task, a first backup query task, and a first restore task.

3. The system of claim 2, wherein the second task comprises a task selected from a group comprising a second backup copy task, a second clone task, a second backup verification task, a second snapshot creation task, a second snapshot backup task, a second snapshot clone task, a second backup delete task, a second backup query task, and a second restore task.

4. The system of claim 1, wherein the first and second tasks are generated to execute concurrently in response to the inter-task pipe communicating the clone copy not being dependent on the backup copy, and wherein a maximum number of concurrent tasks to be executed concurrently is designated by the first client computer.

5. The system of claim 1, wherein at least one of a retention policy that specifies a duration for data retention, a browse policy that specifies a duration for browsing specified data, a number of copies to be created, and a number of retries to attempt before halting further attempts following a failed task is designated by the first client computer.

6. The system of claim 1, wherein the second client comprises multiple source nodes, wherein the multiple source nodes comprise at least one of a disk source node, a tape source node, and a source node comprising a combination of disks and tapes, and wherein the first destination server comprises multiple destination nodes, wherein the multiple destination nodes comprise at least one of a disk destination node, a tape destination node, and a destination node comprising a combination of disks and tapes.

7. The system of claim 1, wherein the first destination server comprises multiple source nodes, wherein the multiple source nodes comprise at least one of a disk source node, a tape source node, and a source node comprising a combination of disks and tapes, and wherein the second destination comprises server multiple destination nodes, wherein the multiple destination nodes comprise at least one of a disk destination node, a tape destination node, and a destination node comprising a combination of disks and tapes.

8. The system of claim 1, wherein the processor-based application, when executed, will cause the computer to generate, by the first client computer, a third task to be executed according to a third execution schedule, the third task causing the third data set stored on the second destination server to be stored as a fourth data set on a third destination server different from the second client computer, the first destination server, and the second destination server, wherein the third task comprises one of a third backup copy task, a third clone task, a third backup verification task, a third snapshot creation task, a third snapshot backup task, a third snapshot clone task, a third backup delete task, a third backup query task, and a third restore task, and wherein enabling execution of the first task and the second task further comprises enabling execution of the third task further based on the third execution schedule.

9. The system of claim 1, wherein the processor-based application, when executed, will cause the computer to enable communication of data between tasks, and persist communication of data between tasks beyond at least one of an application crash, a system outage, and a network failure.

10. The system of claim 1, wherein enabling execution of the first task and the second task comprises a policy engine executing a policy which comprises the first task and the second task, and wherein the policy engine executes remote procedure calls to execute the first task and the second task.

11. The system of claim 10, wherein the processor-based application, when executed, will cause the computer to execute the policy based on a policy schedule to at least one of monitor task failure, log task output, suspend a task, and resume execution of a suspended task.

12. The system of claim 1, wherein enabling execution of the first task and the second task comprises executing a copy task for a duration of a copy window and executing the copy task for a duration of a catch up window when executing the copy task for the duration of the copy window is insufficient to complete execution of the copy task.

13. A computer-implemented method for a data protection policy generator, the method comprising:
generating a first task to be executed according to a first execution schedule, the first task causing a first data set residing on a second client computer to be stored as a second data set on a first destination server different from the second client computer, the second data set being a backup copy of the first data set;
generating a second task to be executed according to a second execution schedule, the second task causing the second data set stored on the first destination server to be stored as a third data set on a second destination server different from the second client computer and the first destination server, the third data set being a clone copy of the second data set;
causing a communication between the first task and the second task, the communication indicating a dependency of the clone copy on the backup copy; and
enabling execution of the first task and the second task based on the first execution schedule and the second execution schedule such that the first task is executed according to the first execution schedule before execution of the second task according to the second execution schedule in response to the communication indicating the dependency of the clone copy on the backup copy.

14. The method of claim 13, wherein the first task comprises a task selected from a group comprising a first backup copy task, a first clone task, a first backup verification task, a first snapshot creation task, a first snapshot backup task, a first snapshot clone task, a first backup delete task, a first backup query task, and a first restore task.

15. The method of claim 14, wherein the second task comprises a task selected from a group comprising a second backup copy task, a second clone task, a second backup verification task, a second snapshot creation task, a second snapshot backup task, a second snapshot clone task, a second backup delete task, a second backup query task, and a second restore task.

16. The method of claim 13, wherein the first and second tasks are generated to execute concurrently in response to the inter-task pipe communicating the clone copy not being dependent on the backup copy, and wherein a maximum number of concurrent tasks to be executed concurrently is designated by the first client computer.

17. The method of claim 13, wherein at least one of a retention policy that specifies a duration for data retention, a browse policy that specifies a duration for browsing specified data, a number of copies to be created, and a number of retries to attempt before halting further attempts following a failed task is designated by the first client computer.

18. The method of claim 13, wherein the second client comprises multiple source nodes, wherein the multiple source nodes comprise at least one of a disk source node, a tape source node, and a source node comprising a combination of disks and tapes, and wherein the first destination server comprises multiple destination nodes, wherein the multiple destination nodes comprise at least one of a disk destination node, a tape destination node, and a destination node comprising a combination of disks and tapes.

19. The method of claim 13, wherein the first destination server comprises multiple source nodes, wherein the multiple source nodes comprise at least one of a disk source node, a tape source node, and a source node comprising a combination of disks and tapes, and wherein the second destination comprises server multiple destination nodes, wherein the multiple destination nodes comprise at least one of a disk destination node, a tape destination node, and a destination node comprising a combination of disks and tapes.

20. The method of claim 13, further comprising generating a third task to be executed according to a third execution schedule, the third task causing the third data set stored on the second destination server to be stored as a fourth data set on a third destination server different from the second client computer, the first destination server, and the second destination server, wherein the third task comprises one of a third backup copy task, a third clone task, a third backup verification task, a third snapshot creation task, a third snapshot backup task, a third snapshot clone task, a third backup delete task, a third backup query task, and a third restore task, and wherein enabling execution of the first task and the second task further comprises enabling execution of the third task further based on the third execution schedule.

21. The method of claim 13, further comprising enabling communication of data between tasks, and persisting communication of data between tasks beyond at least one of an application crash, a system outage, and a network failure.

22. The method of claim 13, wherein enabling execution of the first task and the second task comprises a policy engine executing a policy which comprises the first task and the second task, and wherein the policy engine executes remote procedure calls to execute the first task and the second task.

23. The method of claim 22, further comprising executing the policy based on a policy schedule to at least one of monitor task failure, log task output, suspend a task, and resume execution of a suspended task.

24. The method of claim 13, wherein enabling execution of the first task and the second task comprises executing a copy task for a duration of a copy window and executing the copy task for a duration of a catch up window when executing the copy task for the duration of the copy window is insufficient to complete execution of the copy task.

25. A computer program product, comprising computer-readable program code to be executed by one or more processors when retrieved from a non-transitory computer-readable medium, the computer-readable program code including instructions to:
generate a first task to be executed according to a first execution schedule, the first task causing a first data set residing on a second client computer to be stored as a second data set on a first destination server different from the second client computer, the second data set being a backup copy of the first data set;
generate a second task to be executed according to a second execution schedule, the second task causing the second data set stored on the first destination server to be stored as a third data set on a second destination server different from the second client computer and the first destination server, the third data set being a clone copy of the second data set;
cause a communication between the first task and the second task, the communication indicating a dependency of the clone copy on the backup copy; and
enable execution of the first task and the second task based on the first execution schedule and the second execution schedule such that the first task is executed according to the first execution schedule before execution of the second task according to the second execution schedule in response to the communication indicating the dependency of the clone copy on the backup copy.

26. The computer program product of claim 25, wherein the first task comprises a task selected from a group comprising a first backup copy task, a first clone task, a first backup verification task, a first snapshot creation task, a first snapshot backup task, a first snapshot clone task, a first backup delete task, a first backup query task, and a first restore task.

27. The computer program product of claim 26, wherein the second task comprises a task selected from a group comprising a second backup copy task, a second clone task, a second backup verification task, a second snapshot creation task, a second snapshot backup task, a second snapshot clone task, a second backup delete task, a second backup query task, and a second restore task.

28. The computer program product of claim 25, wherein the first and second tasks are generated to execute concurrently in response to the inter-task pipe communicating the clone copy not being dependent on the backup copy, and wherein a maximum number of concurrent tasks to be executed concurrently is designated by the first client computer.

29. The computer program product of claim 25, wherein at least one of a retention policy that specifies a duration for data retention, a browse policy that specifies a duration for browsing specified data, a number of copies to be created, and a number of retries to attempt before halting further attempts following a failed task is designated by the first client computer.

30. The computer program product of claim 25, wherein the second client comprises multiple source nodes, wherein the multiple source nodes comprise at least one of a disk source node, a tape source node, and a source node comprising a combination of disks and tapes, and wherein the first destination server comprises multiple destination nodes, wherein the multiple destination nodes comprise at least one of a disk destination node, a tape destination node, and a destination node comprising a combination of disks and tapes.

31. The computer program product of claim 25, wherein the first destination server comprises multiple source nodes, wherein the multiple source nodes comprise at least one of a disk source node, a tape source node, and a source node comprising a combination of disks and tapes, and wherein the second destination comprises server multiple destination nodes, wherein the multiple destination nodes comprise at least one of a disk destination node, a tape destination node, and a destination node comprising a combination of disks and tapes.

32. The computer program product of claim 25, wherein the computer-readable program code includes further instructions to generate, by the first client computer, a third task to be executed according to a third execution schedule, the third task causing the third data set stored on the second destination server to be stored as a fourth data set on a third destination server different from the second client computer, the first destination server, and the second destination server, wherein the third task comprises one of a third backup copy task, a third clone task, a third backup verification task, a third snapshot creation task, a third snapshot backup task, a third snapshot clone task, a third backup delete task, a third backup query task, and a third restore task, and wherein enabling execution of the first task and the second task further comprises enabling execution of the third task further based on the third execution schedule.

33. The computer program product of claim 25, wherein the computer-readable program code includes further instructions to enable communication of data between tasks, and persist communication of data between tasks beyond at least one of an application crash, a system outage, and a network failure.

34. The computer program product of claim 25, wherein enabling execution of the first task and the second task comprises a policy engine executing a policy which comprises the first task and the second task, and wherein the policy engine executes remote procedure calls to execute the first task and the second task.

35. The computer program product of claim 34, wherein the computer-readable program code includes further instructions to execute the policy based on a policy schedule to at least one of monitor task failure, log task output, suspend a task, and resume execution of a suspended task.

36. The computer program product of claim 25, wherein enabling execution of the first task and the second task comprises executing a copy task for a duration of a copy window and executing the copy task for a duration of a catch up window when executing the copy task for the duration of the copy window is insufficient to complete execution of the copy task.

* * * * *